June 4, 1929.  J. A. BROWN  1,715,814

INSULATED SHIPPING CONTAINER

Filed Aug. 8, 1927

Inventor:
Judd A. Brown

Patented June 4, 1929.

1,715,814

UNITED STATES PATENT OFFICE.

JUDD A. BROWN, OF BUCKSPORT, CALIFORNIA.

INSULATED SHIPPING CONTAINER.

Application filed August 8, 1927. Serial No. 211,383.

My invention relates to an insulated container for shipping or transportation purposes, combined with the use of certain specified insulating material.

An object of the invention is to provide an efficient and noncumbersome insulated shipping container which may be adapted to all classes of transportation.

Another object of the invention is such that if desired it is economically possible to discard the container after having made the shipment.

Another object is to produce an insulated shipping container substantially lighter than containers now used in methods of transporting products necessitating insulation against heat and cold, thus saving considerable on freight charges.

Another object is to provide an insulated shipping container which may be used for either hot or cold products.

Another is to provide an insulated shipping container which may be used for products requiring refrigeration while in transit.

Another object is to provide an insulated shipping container which will maintain a temperature of uniform degree within the container.

Another object of the invention is to enable shipment of cold storage products without ice, a method being employed of precooling the product and the container before shipment.

Another object of the invention is to produce a container so that when ready for shipment it is hermetically sealed thus preventing any escape of liquid or odor from the contained product therein.

Another object is to provide an insulated shipping container which is convenient to use and manipulate.

Another object is to provide an insulated shipping container which is strong, durable and compact.

Another object is to provide an insulated shipping container which is composed of few and simple part or parts and may be manufactured at a comparatively slight cost.

Other objects and advantages may become apparent to persons who read the following details of description in connection with the accompanying drawings.

Figure 1:
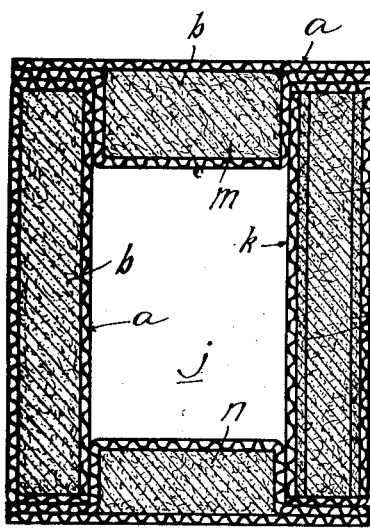
Figure 2:
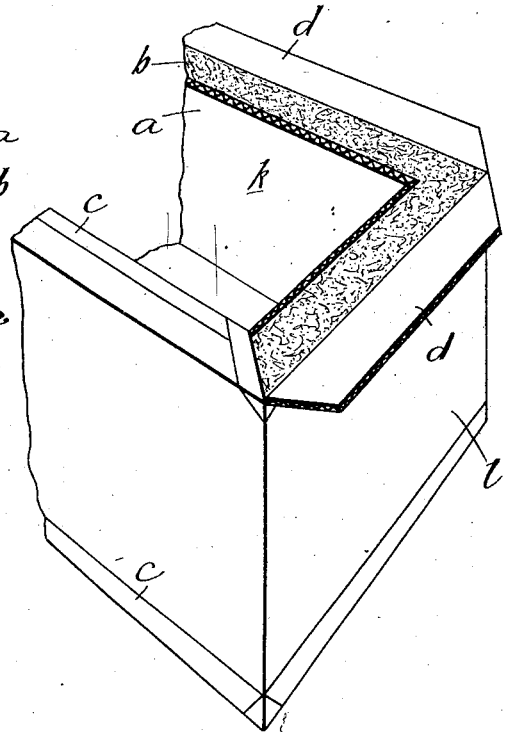
Figure 3:
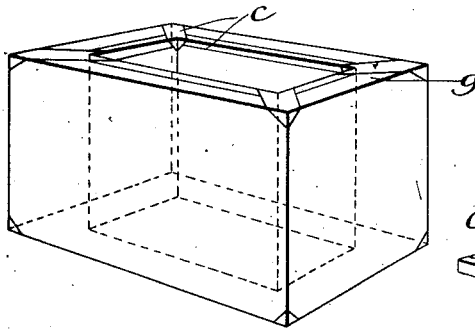
Figure 4:
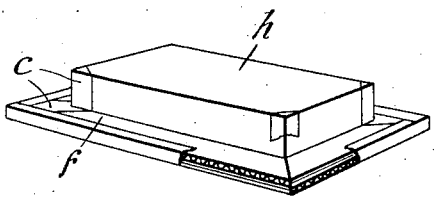

In the drawings illustrating the principles of this invention and the best mode now known to me of applying these principles; Figure 1 is a vertical section of the entire apparatus; Figure 2 is a perspective view showing flaps closed and opened, between outer and inner walls; Figure 3 is a perspective view of container without the end or lid in place; Figure 4 is a perspective view of the top or bottom end.

Referring to the drawings in detail similar letters correspond with similar parts throughout the several views.

The insulation, indicated on the drawings by letter B, consists of shredded redwood bark. In grinding, hogging or in breaking up of redwood bark in any manner the product consists of long and short fibres and dust. By subjecting this product to screening the coarser or long fibre can be removed, leaving the fine fibre and dust like particles. It is this latter grade of the separation which is to be used as insulation in the container and is termed B in the drawings and description herewith. The insulation is absolutely without any form of binder aside from the box board walls which hold it in place. The insulation is applied in a lose form and tamped down into place at a sufficient density to insure against any shift or readjustment after container is sealed. It is to be dry as possible but without any special treatment before installation to attain this end other than sufficient time for thorough air drying.

There are other minor objects and features of advantage in upholding the superior points of above mentioned container over prevailing customary competitive methods. The accompanying drawings illustrating the principle and method of construction together with the following description referring throughout to said drawings will give a clear vision of the major factors involved. As there are no specific dimensions given on the accompanying drawings it is so left intentionally as each individual shipping problem will have to be met with a container designed of the proper cubical capacity for the product, and in sizes convenient for the consumer. Also, the thickness of the insulated wall will be determined by the nature of the product to be carried and the length of time said wall must perform efficient service to the product in transit. The maximum dimensions of the containers and principle of construction involved will comply and be in coordination with the rules and regulations as established in the consolidated freight classification, parcel post and express classifications. Therefore, aside from general principle of construction, combined with herein specified insulating material, I do not limit myself to any given dimensions but shall be governed by established rules and regulations covering the shipment of products adaptable to said container.

Letter A indicates the box board, of which the entire hull is constructed. In general this would be of double surface corrugated water resistant box board.

Letter B indicates the insulating material which is elsewhere described together with the form of application. C indicates gummed tape over the openings or cut edges, which are held in place and sealed by the use of gummed tape. D shows the lap which folds over to the inner wall from the outer wall and is of same piece as outer wall. The outer and inner wall are joined together and sealed by means of C, and which actually forms the end of the tubular shape section or body of the box. The inner and outer wall are indicated on the drawings as K and L respectively. The carrying capacity or the insulated chamber is shown by the letter J. E shows the glue lap joints on K and L, K folding on the outside and L folding on the inside the reason for this being so there will be no obstructions on the surfaces that are exposed, namely the outside of wall L and the inside of wall K. Also to produce a perfectly symmetrical container particularly so that the top and bottom indicated by M and N respectively, will fit tightly into their respective places. After lap D has been joined to K by means of C and the forty five degree seams running out to the corners formed by this junction sealed, the box is inverted and insulation inserted as shown in Figure 2, from the opposite end. When this has been done the top end is likewise sealed and a tubular effect is obtained as shown in Figure 3. Figure 4 shows the construction of the pieces which fit into the ends of the main or middle section. One of these pieces is securely fastened to the main body by the application of glue to surface F which when in place will adhere to surface marked G, thus forming the bottom of the box.

The piece inserted at the opposite end automatically forms the top or lid which may or may not be sealed by gummed tape after contents have been placed within. When M and N are in place the thickness through any wall is equal. The embossed part or insulated section indicated by H in Figure 4 is so constructed that it very accurately fits into the main section or part J. The end pieces may also be constructed with the insulated section running the full length and width of the main section and held in place by over-hanging sides built of the box board which would run all or in part toward one seam running around the middle of the box longitudinally.

The container in giving its most efficient service should be precooled to same or lower temperature than the product to be carried before placing contents within. When proper degrees are reached with both container and product it is then sealed and ready for shipment.

While the container is sturdily built to give the service and wear it is intended, it may be necessary to give the out-side walls a little further physical protection, this may be accomplished by substituting a wooden slab for the bottom piece of corrugated boxboard and by reinforcing the corners with suitable metal strips. Also, it may be found necessary in shipping certain grades of products to further protect the outer surfaces against moisture and this may be accomplished by the application of a suitable water-proofing solution.

Although I have described the embodiment of my invention very specifically it is not intended to limit my invention to these exact details of construction and arrangement of parts, but I may make minor changes within the scope of the inventive idea disclosed in the foregoing description and appended claims, and the insulating shipping container may be made in various sizes and the walls of various material to suit the needs of all who use my new insulating shipping container.

I claim:

1. An insulated shipping container, the walls of which consists of water resistant box board, preferably double surfaced corrugated box board with small fibre of shredded redwood bark as insulation, forming a space within said walls.

2. An insulated shipping container consisting of double constructed walls, namely, an inner and outer wall, and to be insulated with a specified material shredded redwood bark inserted between, forming a space enclosed by said constructed walls.

3. An insulated shipping container using shredded redwood bark, between the outer and inner walls, which enclose a space, or room.

4. An insulated shipping container using shredded redwood bark insulation, applied in a dry state without any binder, at sufficient density to prevent any shifting of particles within said walls and to insure maximum insulation value.

In testimony whereof I have hereunto set my hand this 1st day of August, 1927.

JUDD A. BROWN.